March 9, 1954     G. SLAYTER     2,671,745
METHOD OF MAKING LOOPED GLASS FIBER MATS AND LAMINATES
Original Filed Aug. 1, 1947     3 Sheets-Sheet 1
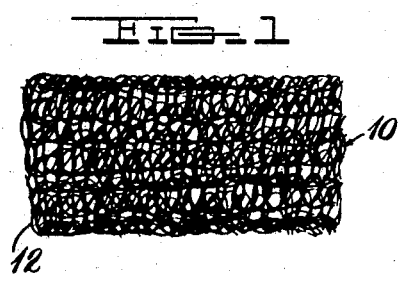
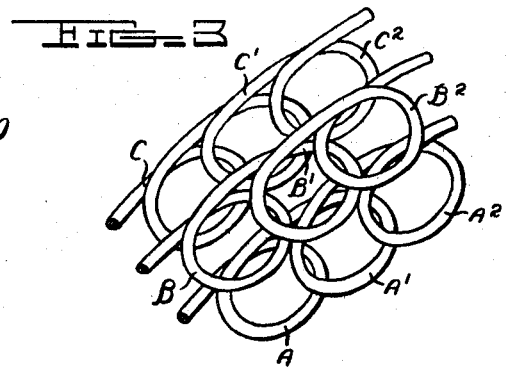
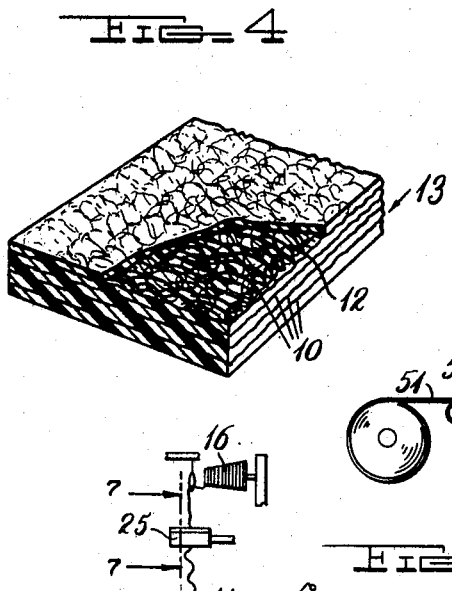
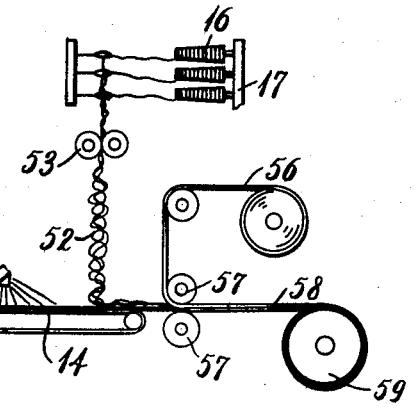
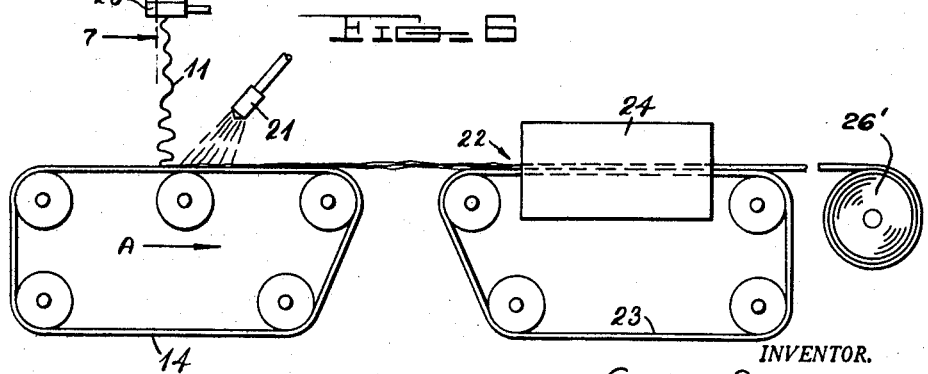
INVENTOR.
GAMES SLAYTER
BY
ATTORNEYS March 9, 1954          G. SLAYTER          2,671,745
METHOD OF MAKING LOOPED GLASS FIBER MATS AND LAMINATES
Original Filed Aug. 1, 1947          3 Sheets-Sheet 2
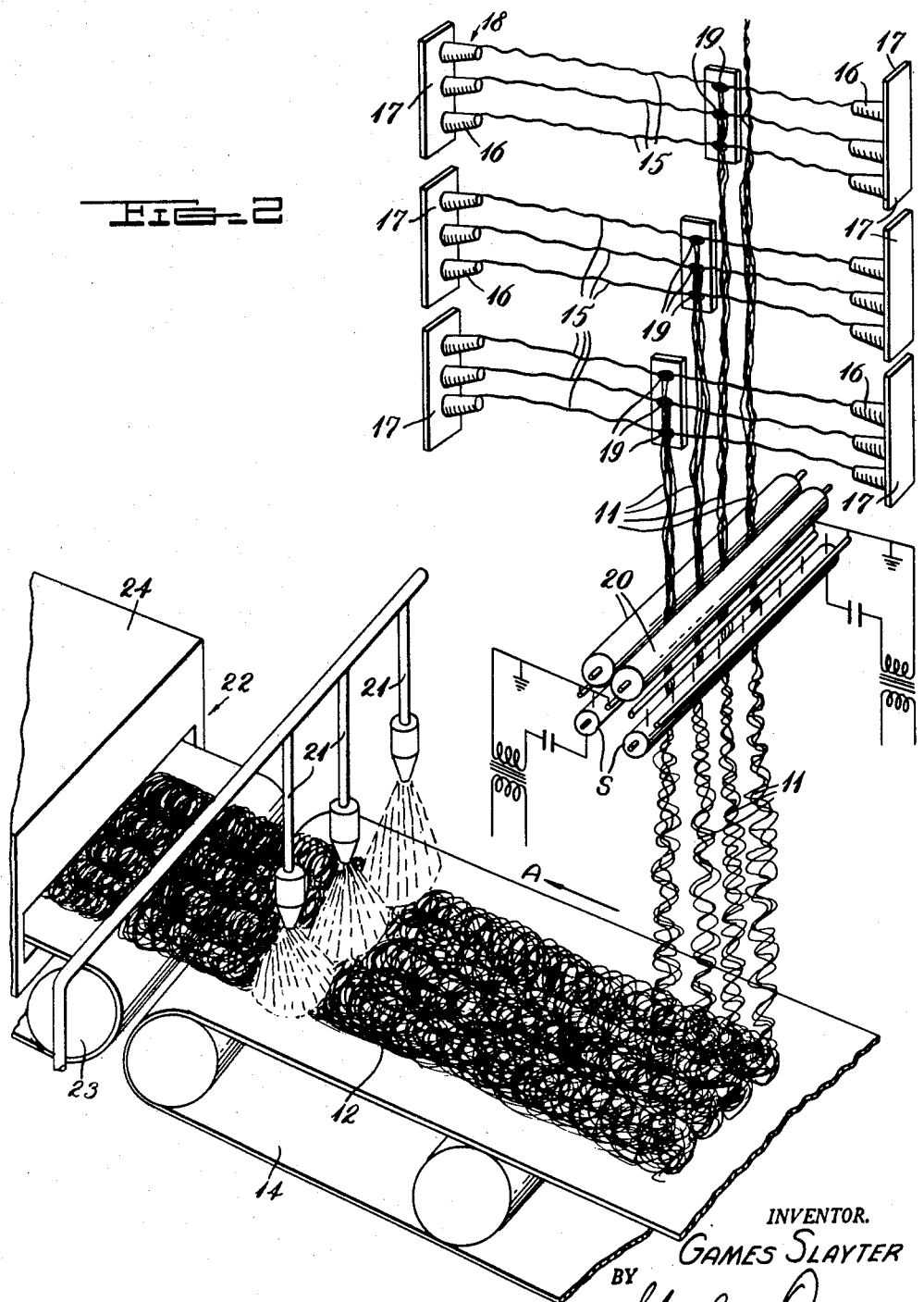
INVENTOR.
GAMES SLAYTER
BY
Staelin & Overman
ATTORNEYS March 9, 1954 G. SLAYTER 2,671,745
METHOD OF MAKING LOOPED GLASS FIBER MATS AND LAMINATES
Original Filed Aug. 1, 1947 3 Sheets-Sheet 3
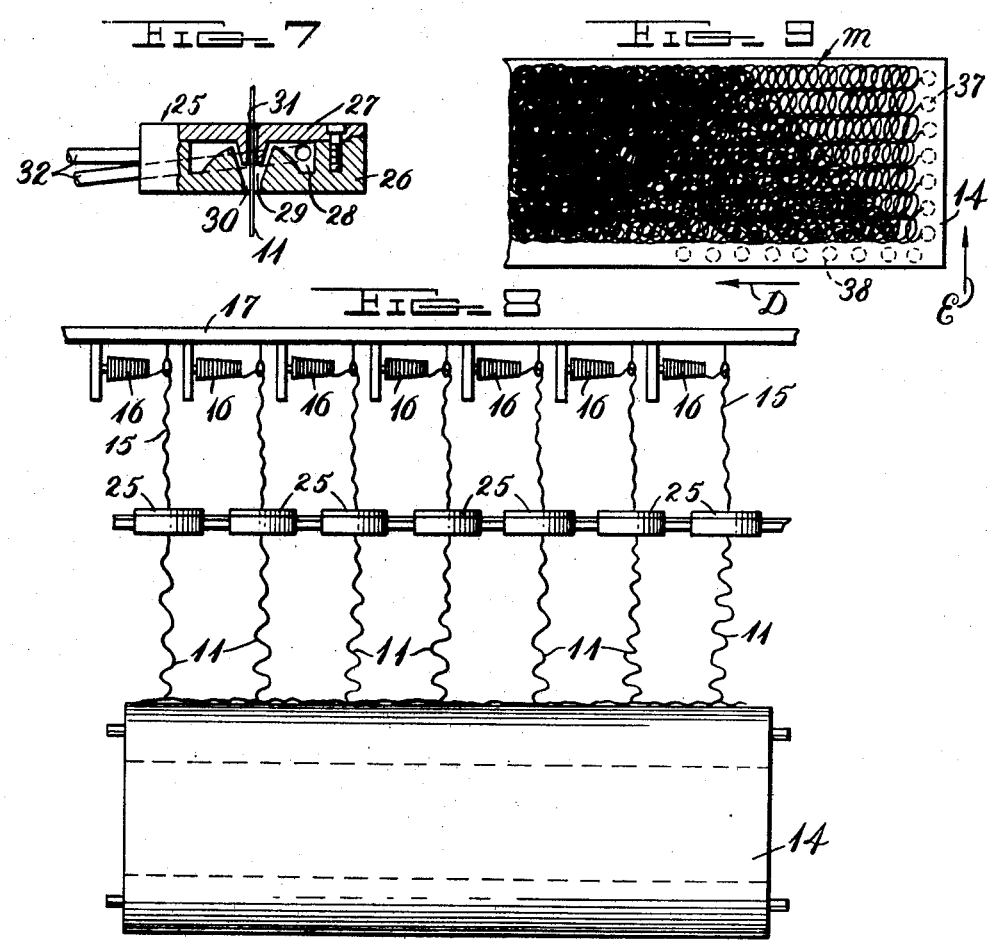
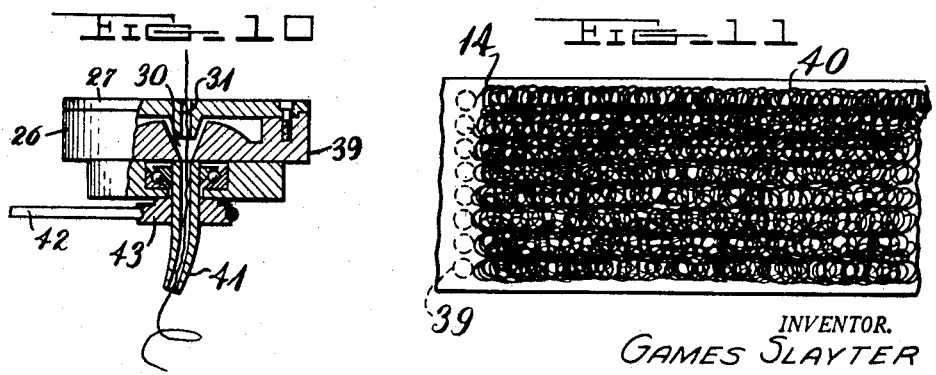
INVENTOR.
GAMES SLAYTER
BY
ATTORNEYS Patented Mar. 9, 1954

2,671,745

UNITED STATES PATENT OFFICE 2,671,745

METHOD OF MAKING LOOPED GLASS FIBER MATS AND LAMINATES

Games Slayter, Newark, Ohio, assignor to Owens-Corning Fiberglas Corporation, a corporation of Delaware Original application August 1, 1947, Serial No. 765,621. Divided and this application June 28, 1950, Serial No. 170,868

2 Claims. (Cl. 154—93)

This invention relates generally to processes of making mats of fibrous material and more particularly glass fiber mats for reinforcing resins, plastics, asphalt, and other materials, for use as a reinforcing fabric for sheet material such as laminated paper and cardboard, as a base fabric for coated fabrics, and as a web or fabric for decorative applications.

An object of this invention is to provide a process of making a thin glass fiber mat having a high concentration of fibers in bundles that in turn are distributed throughout the mat with such uniformity as to afford extremely high impact and flexural strength to any plastic or resinous body in which the mat is incorporated.

Another object of this invention is to provide a glass fiber mat having fibers extending substantially continuously through the mat and being oriented to provide high tensile strength characteristics in all directions parallel with the major faces of the mat.

Still another object of this invention is to provide a fabric-like mat comprising a planular structure of substantially continuous strands of glass fibers arranged in overlapping coils or helixes that may be bonded together at their points of juncture. This pattern not only assures a uniform distribution of strands extending in different directions in the mat, but in addition, imparts a pleasing and attractive appearance to the mat especially when colored. This arrangement of the strands also provides sufficient extensibility in the mat to enable readily stretching the mat in all directions parallel to its major faces when the binder is softened or removed. This feature is of great importance where the mat is used as a reinforcement for molded plastic articles since it lends itself readily to deep drawing or other operations requiring deformation of the material to complex shapes.

A further object of this invention is to provide a mat of the type set forth wherein the coils or helixes are of uniform size. One consequence of having uniform coils or helixes in the mat is that the appearance of the mat is enhanced and this feature is of importance in instances where the mat is used as a decorative fabric or as a reinforcement for clear resins or plastics. Moreover, the provision of uniform coils aids materially in obtaining the uniform distribution of the fibers in the mat required to afford high impact strength to the resinous or plastic body reinforced by the mat.

A still further object of this invention is to provide a glass fiber mat or reinforcement for resinous or plastic bodies wherein the mat comprises a planular structure of substantially continuous glass fibers arranged in overlapping coils integrally bonded together with a resinous material adapted to soften in the presence of the laminating resin to enable shifting of the fibers and smoothing out any irregularities in the mat.

Still another object of this invention is to provide a glass fiber mat of the general type outlined above having a substantially continuous length and possessing sufficient flexibility to enable the mat to be readily rolled into package form. This arrangement facilitates and materially reduces the cost of shipping bonded fibrous glass material to plants where it is further processed.

The foregoing as well as other objects will be made more apparent as this description proceeds, especially when considered in connection with the accompanying drawing, wherein:

Figure 1 is a diagrammatic plan view of a fibrous mat embodying the features of this invention;

Figure 2 is a diagrammatic perspective view of one type of equipment that may be employed to produce the mat shown in Figure 1;

Figure 3 is a diagrammatic perspective view indicating on a gigantic scale the general pattern formed by the fibers;

Figure 4 is a fragmentary perspective view of a plastic or resinous body reinforced with mats of the type shown in Figure 1;

Figure 5 is a diagrammatic elevational view of another modification of the invention;

Figure 6 is a diagrammatic side elevation of another form of mat producing equipment;

Figure 7 is a sectional view taken substantially on the line 7—7 of Figure 6 through a part of the apparatus shown in Figure 6;

Figure 8 is a diagrammatic end elevation of the apparatus shown in Figure 6;

Figure 9 is a diagrammatic plan view illustrating a mat produced by the equipment shown in Figure 6 and also illustrating the arrangement of blowers;

Figure 10 is a sectional view of a modified form of blower; and

Figure 11 is a diagrammatic plan view illustrating a mat produced by the blower shown in Figure 10.

This application is a division of my copending application Serial No. 765,621, filed August 1, 1947, now abandoned.

A mat made by the process of this invention is illustrated diagrammatically in Figure 1 of the drawings by the reference numeral 10 and comprises a planular structure of fibers collected together into strands or yarns which are bonded together by a suitable binding agent. The fibers are preferably of glass and preferably also are of the continuous type, that is, each fiber extends substantially continuously throughout the mat. Yarns and strands of such fibers are disclosed and claimed in the Slayter and Thomas U. S.

Patent No. 2,133,238, dated October 11, 1938. Strands or yarns of other kinds of fibers and other types of glass fibers may also be used to form the mat 10.

More particularly, the mat 10 is built up from strands or yarns 11 of substantially continuous fibers with the strands or yarns arranged in overlapping coils or helixes 12 bonded together at the points of intersection thereof to provide a planular structure having sufficient flexibility to enable stretching the mat in all directions parallel to the major faces of the mat. Thus, regardless of the thickness of the mat, the coils or helixes will contract or elongate in one direction or another under the influence of forming stresses to enable conforming the mat to complex shapes and contours.

This extensibility of the mat is particularly advantageous in cases where the mat is used as a reinforcement for plastics or resinous bodies to be formed by deep drawing or similar operations. The flexibility of the mat is also advantageous in that it enables packaging the mat in roll form and at a density higher than the normal density of the mat. This reduces the cost of shipping as it enables a greater quantity of material to be accommodated in less shipping space. Moreover, the resin binder applied to the mat may be fully cured prior to or after packaging the mat without making the mat so rigid as to interfere with rolling or unrolling of the mat. Fully curing or drying the resin binder prior to packaging the mat assures sufficient integrity and strength in the mat to enable shipping the same in relatively lightweight cartons or inexpensive paper wrappings.

In Figure 4 of the drawings a typical plastic laminate is depicted on exaggerated scale and is indicated by the reference numeral 13. It is shown as reinforced by a plurality of glass fiber mats 10 fabricated in accordance with this invention. This laminate may be formed of practically any of the commonly used laminating resins of the high, low or contact pressure types depending upon the particular use of the laminate.

In Figures 1 and 4 of the drawings there is shown generally the pattern formed by the glass fibers during fabrication of the mat 10. It will be understood from these figures in the drawings that the glass fibers form flat substantially uniform circular loops or coils arranged in rows extending lengthwise of the mat with adjacent coils in each row overlapping one another and with the coils in one row overlapping the coils in the next adjacent rows. This relationship of the coils 12 may best be seen from Figure 3 of the drawing where three partial rows of coils are illustrated on a gigantic scale. While Figure 3 of the drawings is illustrative, it is not, strictly speaking, accurate, because the coils intermingle or overlap to a much greater extent than shown so as to provide a finished mat of substantially uniform fiber distribution The extent of this overlapping of the coils and of the adjacent rows of coils is not precise and the finished mat has an overall appearance of overlapping coils in more or less random relationship.

With this in mind, reference is now made to Figure 3, wherein three rows of coils are indicated by the reference characters A, B and C. The coil A' is the first full coil in row A, and is overlapped by the adjacent coil $A^2$ in row A. The coil B' is the first full coil in row B and this coil not only overlaps coil A' in row A, but also overlaps or is overlapped by coil C' in row C. In the present illustration coil B' in row B overlaps coil C' in row C, and is overlapped by coil $B^2$ in row B. The coil $B^2$ in row B overlaps or is overlapped by coil $C^2$ in row C, and coil $A^2$ in row A. For the purpose of illustration, coil $B^2$ in row B overlaps coils $A^2$ in row A and coils $C^2$ in row C. The overlapping relationship between the coils in adjacent rows may, of course, vary but in any case, the coils form independent closed or nearly closed loops, and are arranged in close overlapping relationship. Moreover, the coils are in effect intermingled in a substantially uniform manner throughout the mat and, as a result, the uniform fiber distribution required to secure uniformly high strengths is assured. Such uniformity also greatly improves the appearance of the mat, and this is of great importance in instances where the mat is used as a reinforcement for clear or transparent resins or plastics.

The mat made by the present invention may not only be inexpensively produced on a production basis, but may be economically shipped to remote plants as a prefabricated sheet capable of being tailored to size for use as a reinforcement for plastics, pipe coverings, acoustical light shades, linoleum base and such other uses requiring a thin, light weight, extremely strong reinforcement. Another feature of the bonded sheets is that the thin mat has sufficient integrity to withstand the stresses of dipping or pulling through a bath of laminating resin.

The method of forming the product previously described will be more fully understood upon considering one type of apparatus suitable for carrying out the several steps of the method. The apparatus schematically shown in Figure 2 of the drawings comprises an endless belt conveyor 14 adapted to be driven by any suitable mechanism in the direction of the arrow A. In the present instance fibrous glass yarns 15 are packaged on spools 16 suitably mounted above the conveyor 14 on a frame 17 in banks or tiers to form a creel 18 and are arranged so that the yarns can be drawn off the ends of the packages or spools through a series of guide eyes 19. Thus any desired number of yarns may be gathered together from each tier of spools.

In practice it is preferred to use twisted glass fiber yarns so that when the latter are withdrawn from the end of the spools 16, they form definite undulations considerably greater than provided by the relatively low degree of natural twist resulting from withdrawing untwisted yarns from the end of the spools. Moreover, twisted yarns provide greater compactness and integrity in the strand which is of consequence in cases where greater density of the mat is required.

Although the number of spools in each tier is not critical and may be varied, nevertheless, for the purpose of illustration, each tier is shown as comprising three spools 16. The yarns 15 from opposed tiers of spools are passed downwardly in parallel through a tier of three guides or eyes 19. Beneath the tiers of guide eyes 19 the yarns are passed between feed rolls 20 and the latter are driven at a constant speed by any suitable power means not shown herein. However, at the delivery side of the feed rolls 20 the yarns from each tier of guide eyes tend to separate and fall independently of one another toward the conveyor 14. Due to the twist in the yarns the latter are laid down on the conveyor in flat spirals to form rows of closed or substantially closed loops or coils with the coils in each row overlapping each other as well as the coils in adjacent rows in the manner shown in Figure 3 of the drawings and described at some length above. Inasmuch as the size of the yarns, degree of twist of the yarns, speed of the feed rolls 20 and the distance between the spools and conveyor 14 are constant, it follows that the size of the coils or loops throughout the mat will be substantially uniform.

The size of the coils may be varied by altering one or all of the conditions just mentioned. By way of illustrating this a particularly satisfactory mat has been produced by spacing the feed rolls 20 approximately forty inches from the top of the conveyor 14 by using 150-1/0 glass fiber yarns twisted .5 to 1 turn per inch. However, these values are far from critical and may be varied considerably to produce mats of various characteristics.

The creel 18 is arranged so that a plurality of strands 11 are substantially uniformly spaced across the width of the conveyor 14. The spacing is predetermined so that the coils 12 formed from the yarns in adjacent strands overlap each other and interlock so that when held together by a binder a single sheet or mat results. The thickness of the mat may be varied by varying the speed of movement of the conveyor 14 relative to the rate at which the strands are deposited on the conveyor.

As the mat of fibrous glass is formed on the conveyor 14, it has applied thereto a suitable binder from spray heads 21 and is conveyed through a heating zone 22 by a second endless belt-type conveyor 23. The belt-type conveyor 23 is spaced in the direction of travel of the mat from the conveyor 14 in order to enable excess resin to drain from the mat before it is introduced to the conveyor 23. If desired, heat may be applied to the underside of the mat as it is conveyed through the space between the conveyors, so as to partially cure the resin and thereby prevent the mat from adhering to the conveyor 23 while it is being advanced through the heating zone 22. The heat at the zone 22 is supplied by a suitable oven 24 and is sufficient to convert the binder to a final set in a relatively short space of time.

Various thermosetting condensation products may be used as a binder, such for example, as phenol formaldehyde, urea formaldehyde, or various modifications and variations of these synthetic materials. However, for ordinary uses of the mat, it has been found that Bakelite in water soluble state is highly satisfactory when applied in aqueous solutions containing 5% to 10% solids. In general practice the finished product may contain 5% to 15% resin by weight of the fibers, although the amounts may vary according to the manner in which the mats are to be used. As little as 2% of resin may at times be sufficient to provide adequate handling characteristics.

If desired, thermoplastic resins such, for example, as butyl or methyl-methacrylate may be used as a binder for the mat. In cases where the mat is to be used as a reinforcement for plastics, the binding resin is preferably but not necessarily compatible with the laminating resin. By way of illustration, let it be assumed that a low molecular weight vinyl chloride vinyl acetate copolymer resin is employed as the binder and that a styrene type resin such, for example, as styrene polyester copolymer is employed as the laminating resin. This and most other thermosetting polyester resins contain one or more solvents which tend to dissolve or soften the resinous binder of the reinforcing mat and permit sufficient shifting of the glass fibers in the mat to iron out any irregularities that may occur during fabrication. The above mentioned binder for the mat and the laminating resin specifically stated are merely examples, and it will be understood that numerous other resins or combinations of resinous materials may be used depending upon the use to which the laminate is to be put.

In order to avoid any possibility of static electricity interfering with the uniform distribution of the yarns in coil formation on the conveyor 14, a pair of static eliminators may be employed. The static eliminators are indicated diagrammatically in Figure 2 of the drawings by the character S and are preferably supported at opposite sides of the glass fiber yarns immediately below the feed rolls 20. Particularly satisfactory results have been obtained by employing static eliminators of the electronic type shown in the Slayter Patent No. 2,333,213, dated November 2, 1943. Equipment of this general type provides an electric discharge of alternating polarity between an emitting electrode and a collecting electrode so arranged with respect to the yarns that ions drift from the electrostatic field between the electrodes to neutralize the charge on the strands 11.

In Figure 6 of the drawings, a different form of apparatus is shown for producing a fibrous glass mat. This apparatus is similar to the one shown in Figure 2 of the drawings, except that the fibrous glass strands or yarns are removed from the spools 16 and are deposited on the conveyor 14 by circular type blowers 25 corresponding in number to the number of yarns and are supported in any suitable manner between the spools 16 and the top of the conveyor 14. Upon reference to Figure 7 of the drawings, it will be noted that the blowers 25 are each formed of separable sections 26 and 27. These sections cooperate with one another to form an air chamber 28 and to provide a conical chamber 29 at the center of the chamber 28. The conical chamber 29 is directed toward the discharge side of the blower and communicates with the chamber 28. The section 26 of the blower is formed with a central aperture 30 aligned with an inlet aperture 31 formed in the blower section 27. The fibrous glass yarns are respectively threaded through the inlet apertures 31 and discharge apertures 30 of the blowers 25 in the manner shown in Figure 7 of the drawings.

Air under pressure from a suitable source of supply is introduced through a conduit 32 into the chamber 28 and is discharged through the outlet aperture. As the air under pressure flows out of the blower through the discharge passage 30, it envelopes the yarn and pulls the yarn through the blower. The air pressure is, of course, sufficient to unwind the strands from the lower ends of the packages 16 but is not strong enough to propel the strands of yarns to the conveyor 14 with any appreciable force. Actually, the downward force applied on the yarns below the blowers is so slight that the undulating configuration of the strands occasioned by the twist of the strands is preserved, so that the strands fall gently on the conveyor in the form of loops or coils. The relationship of the blowers with reference to the conveyor is such that the loops or coils are laid down on the conveyor in rows with the adjacent coils in each row overlapping one another and with the coils in adjacent rows also overlapping. The fibrous glass mat M thus formed is impregnated with a resinous binder of any one of the types previously discussed in connection with the first embodiment of this invention.

In actual practice, the thickness of the fibrous mat and the quantity of resin employed is determined to provide a mat having sufficient flexibility to enable rolling the mat leaving the delivery side of the conveyor 24 into a package 26' having a density greater than the normal density of the mat. Thus, prefabricated bonded glass fiber mats of practically any desired length may be packaged into a relatively small space and shipped to the fabricator for incorporation in the desired product in the same manner as the mat 10.

For some applications of the fibrous glass mat, it may be advantageous to lay another row of loops or coils of glass fibers across the rows produced by the blowers 25. With this in view, reference is made to Figure 9 of the drawings wherein the reference character 37 indicates in broken lines a plurality of stationary, circular type blowers similar to the blowers 25 and supported above the conveyor 14 in spaced relation to each other transversely of the conveyor. This bank of blowers serves to lay down on the traveling belt-type conveyor a plurality of fibrous glass strands in a pattern which may at times approximate an extended spiral form extending predominantly in the direction of conveyor travel indicated by the reference character D. A second bank of blowers 38 is suspended above the conveyor 14 in spaced relation to each other in the direction of travel of the conveyor. This bank of blowers is supported by a movable framework (not shown) for movement transversely of the conveyor back and forth in the direction indicated by the arrow E in Figure 9 of the drawings. Thus, the bank of blowers 38 lays down fibrous glass strands which extend predominantly crosswise of the strands laid down by the blowers 37 and produce three distinct layers due to the movement of the conveyor. The arrangement is such that the fibrous glass strands in adjacent layers of the mat extend in different directions and impart greater strength to the mats in corresponding directions.

In order to assist laying the glass fiber yarns down on the conveyor in a substantially uniform circular pattern by the blower method, the arrangement shown in Figure 11 of the drawings may be employed. In this figure of the drawings, the reference character 39 indicates a blower adapted to be supported in multiples above the conveyor 14 in the same manner as the blowers 25 to form the mat 40 shown in Figure 11 of the drawings. The blower 39 shown in Figure 10, however, is equipped with a guide 41, which extends downwardly from the discharge aperture 30 of the blower, and is supported on the blower for universal movement. The arrangement is such that air under pressure flowing through the discharge opening 30 in the blower imparts a gyrating motion to the guide 41 and the latter in turn reacts on the fibrous glass strand to impart a helical contour to the strand. Also the guide 41 may be positively rotated by suitable means including a belt 42 passing around a pulley 43 secured to the guide. As a result, the fibrous glass yarns forming the strands are deposited on the conveyor 14 in the form of continuous rows of loops and the arrangement of the blowers is such that the loops in one row overlap each other as well as the loops in adjacent rows.

The present mat is useful for reinforcing or for backing up sheet material such as sheets of resin or rubber, for example, chlorinated rubber, vinylidene chloride and the like, and paper sheets and webs, for example, laminated reinforced paper. As illustrated in Figure 5, the sheet material, in this instance kraft paper, may be fed as a continuous web 51 past the strand deposition zone and either be supported by or replace a conveyor such as the conveyor 14 so that strands 52 fed by coacting rolls 53 from spools the same as those previously described are deposited directly on the web 51. An adhesive, for example, asphalt, may be applied to the web in advance of the strand deposition region by a spray gun 54 directed onto the web to aid in securing the strands in place on the sheet material. Alternatively the adhesive may be applied after the strands are deposited on the web.

In some cases a second web of the same sheet material, kraft paper in the present instance, or of a different sheet material may be applied over the deposited strands, and the two layers of sheet material pressed together by coacting rolls 57 to be cemented together by suitable adhesives, for instance, the asphalt applied by the spray gun 54. The finished reinforced paper or reinforced laminated paper 58 is wound into a roll 59 or packaged in other suitable manner. In this way the mat is formed directly on the sheet material which it is desired to reinforce and the need for a number of conventional handling and fabricating operations is eliminated.

These and various other modifications of the invention may be adopted without departing from the spirit of the invention and the scope of the claims.

I claim:

1. The method of making a glass fiber product comprising advancing a web in the direction of its length, applying an adhesive material to a surface of said web, feeding a plurality of strands each made up of a multiplicity of intertwisted glass fibers onto said web, and looping said strands back and forth on said web as they are deposited.

2. The method of making reinforced laminated paper which comprises feeding a continuous web of paper in the direction of its length, applying asphalt to a surface of said web, feeding a plurality of glass fiber strands toward said web, depositing the strands on the asphalt-covered surface of the web in substantially closed loops, and laminating said web with the deposited fibrous material thereon with a second web of paper and securing the two together with the reinforcing fibrous material therebetween.

GAMES SLAYTER.

References Cited in the file of this patent

UNITED STATES PATENTS

| Number | Name | Date |
|---|---|---|
| 1,365,061 | Respess | Jan. 11, 1921 |
| 1,914,801 | Chadwick | June 20, 1933 |
| 2,076,343 | Humphner | Apr. 6, 1937 |
| 2,224,274 | Powers | Dec. 10, 1940 |
| 2,392,882 | Roberts | Jan. 15, 1946 |
| 2,429,486 | Reinhardt | Oct. 21, 1947 |
| 2,546,230 | Modigliani | Mar. 27, 1951 |
| 2,577,214 | Slayter | Dec. 4, 1951 |
| 2,638,146 | Rounseville et al. | May 12, 1953 |